United States Patent [19]

Taylor

[11] Patent Number: 4,564,667

[45] Date of Patent: Jan. 14, 1986

[54] UREA-FORMALDEHYDE RESIN MANUFACTURE

[75] Inventor: David Taylor, Halesowen, England

[73] Assignee: BIP Chemicals Limited, Manchester, England

[21] Appl. No.: 704,405

[22] Filed: Feb. 22, 1985

[30] Foreign Application Priority Data

Feb. 23, 1984 [GB] United Kingdom ............... 8404758

[51] Int. Cl.$^4$ ................... C08G 12/34; C08G 12/30
[52] U.S. Cl. ................................ 528/256; 525/398; 525/405; 525/406; 528/254; 528/257; 528/258; 528/265; 528/268
[58] Field of Search ............... 528/254, 256, 257, 258, 528/265, 268; 525/398, 405, 406

[56] References Cited

U.S. PATENT DOCUMENTS

| | | | |
|---|---|---|---|
| 2,413,697 | 1/1947 | Edgar | 528/256 |
| 3,842,039 | 10/1974 | Vargiu et al. | 528/259 X |
| 4,064,088 | 12/1977 | Reaser | 528/268 X |
| 4,113,701 | 9/1978 | Laqua et al. | 528/256 X |
| 4,174,310 | 11/1979 | Hubbard | 528/256 X |

FOREIGN PATENT DOCUMENTS

| | | |
|---|---|---|
| 71278 | 7/1954 | United Kingdom . |
| 71279 | 7/1954 | United Kingdom . |
| 737468 | 9/1955 | United Kingdom . |
| 834316 | 5/1960 | United Kingdom . |
| 1047913 | 10/1966 | United Kingdom . |
| 1521330 | 8/1978 | United Kingdom . |

*Primary Examiner*—Lucille M. Phynes
*Attorney, Agent, or Firm*—Cushman, Darby & Cushman

[57] ABSTRACT

A solid urea-formaldehyde resin is provided, having a degree of condensation of 25% to 45%.

A process for making the resin is also described and includes several steps. Urea and formaldehyde is first reacted with a molar ratio of U:F of 1:2.5 or more then concentrated. Further urea is added to reduce the ratio to the range 1:1.1 to 1:2 and further concentration is achieved without precipitation of solid resin by the use of a stabilization agent.

15 Claims, No Drawings

UREA-FORMALDEHYDE RESIN MANUFACTURE

This invention relates to the manufacture of amino-formaldehyde resins, and particularly but not exclusively to manufacture of resins from urea and formaldehyde.

The manufacture of urea-formaldehyde (U.F.) resins has been well-known, and practiced commercially for many years, but a particular problem has always remained. It has been possible to make relatively highly condensed solid resins, by which is meant resins with a degree of condensation of more than 50%, and it has been possible to make resins of lower condensation levels in aqueous solution but the manufacture of a solid U.F. resin with a relatively low degree of condensation eg 25 to 45% has not been commercially achieved despite the fact that such a resin would have many uses.

Urea-formaldehyde resins are reactive materials whose reactivity means that it is difficult to prepare resins having specific intermediate degrees of condensation. They are usually prepared by reaction of their components in water and the position is further complicated by the fact that the resins' solubility in water depends upon (a) the degree of condensation of the resin, (b) the ratio of formaldehyde to urea and (c) the temperature.

In the past the problem has been in producing a high solids resin in a controllable manner so as to keep the degree of condensation below the point where solid resin precipitates out of solution.

Solid urea-formaldehyde condensation products have been prepared previously; for example UK Pat. Nos. 712178, 712179 and 737468 describe the manufacture of such products for fertilizers. However in these examples the ratio of formaldehyde to urea is low, 1:1 or less, where the solubility of the product is very low, and these materials are prepared by precipitation from solution.

UK Pat. No. 834,316 describes preparation of a solid resin for use as an adhesive. This however, is a very lightly condensed material which is mainly composed of methylol urea derivatives and is solid at room temperature when containing 30 to 45% of water. It is prepared under conditions which allow very little condensation to take place.

UK Pat. No. 1,047,913 describes another solid resin for use as a fertilizer. This is prepared by initial reaction and concentration to 50% solids at a formaldehyde to urea ratio of 3 to 6:1. More urea is then added and further condensation and precipitation of the resin takes place. This material is thus a relatively highly condensed material which is solid at room temperature when containing 10 to 50% water (the preferred level is said to be between 20 and 35% water).

UK Pat. No. 1,521,330 describes another solid resin which is used in a coating composition but this resin again is a highly condensed precipitated resin which is stated to be insoluble.

We have now devised a process which can be used for the manufacture of a resin which has a degree of condensation 25 and 45 per cent and is a brittle solid.

Thus according to the present invention there is provided a solid resin comprising a reaction product of urea and formaldehyde having a molar ratio of formaldehyde to urea which is between 2.0:1 and 1.1:1 and degree of condensation (as hereinafter defined) which is between 25 a and 45 per cent.

According to the present invention also there is provided a process for the manufacture of a solid urea-formaldehyde resin which comprises the steps of (a) reacting a solution of formaldehyde in water with urea at a molar ratio of formaldehyde to urea which is greater THAN 2.5:1, (b) concentrating the solution so made until its total water content was less than 50% by weight.

(c) adding further urea to adjust the molar ratio of formaldehyde to urea to between 2.0 :1 and 1.1:1 and (d) concentrating the solution further without precipitation of solid resin to reduce the water content to such a level that on cooling the liquid resin product, a friable solid is obtained, wherein a stabilization agent is reacted into said solution of formaldehyde or formaldehyde and urea prior to step (d) in order to prevent precipitation of resin in step (d).

Using this process U.F. resins can be made which are solid, and can be ground etc, and yet have degrees of condensation of between 25% and 45%. By "degree of condensation" we mean a value, expressed as a percentage, which represents the stage the resin has reached in the process of condensation which leads to a fully cured resin. It is calculated from the following formula:

$$\frac{\text{Total formaldehyde content (1)} - \text{Methylol formaldehyde content (2)}}{\text{Total formaldehyde content (1)}} \times 100\%$$

(1) Determined by acid hydrolysis with Phosphoric Acid followed by sulphite determination of liberated formaldehyde.
(2) Determined by ACC Sulphite method.

The first step of the process is carried out in aqueous solution preferably under slightly acid conditions, and conveniently can utilise urea and formalin, the latter being at its usual concentration level of 30 to 50% by weight of formaldehyde. If desired some eg. up to 40 mole % of the urea can be replaced by another monomer such as melamine or benzoguanamine, but the molar ratio of formaldehyde to total amino compound must then be increased if required to maintain an excess of formaldehyde no less than that in the 2.5 to 1 ratio of formaldehyde to urea mentioned in step (a). (note 1 mole urea will react with 4 moles formaldehyde whereas 1 mole melamine will react with 6 moles formaldehyde).

Water may be allowed to distil off the reacting mixture during step (a) so that concentration of the solution is begun.

The pH is preferably 5.5 to 6.5 and can be adjusted using such reagents as sodium hydroxide and formic acid. It is preferred not to use a mineral acid.

The first step is preferably carried on until the viscosity of the solution has reached about 40 centipoise at 25° C. (it being necessary to keep a check on viscosity). The viscosity may, however, be allowed to go as high as 5 poise at 25° C. in step (a) in which case the concentration step (b) will already have been achieved and no separate vacuum concentration stage will be necessary. Preferably step (a) is terminated by rapid cooling of the reaction mixture eg. to 65° C. or below, and the pH is adjusted to 7.5 to 8.5 by a suitable reagent eg sodium hydroxide.

A separate step (b) where necessary is carried out at the pH 7.5 to 8.5 in conventional manner, e.g. by vacuum distillation, preferably using steam as a heating medium, and a pressure which is up to 650 mm Hg below atmospheric pressure. This step is facilitated by the stability of the intermediate product produced in step (a) in which the molar ratio of formaldehyde to urea is an important factor, and the solution at the end of step (b) is becoming highly concentrated.

In this concentrated solution is dissolved further urea to bring down the ratio of formaldehyde to urea, as mentioned previously, to the desired ratio between 2.0:1 and 1.1:1. An excess of urea bringing the ratio below 1:1 must not be used.

In order to prevent UF resin precipitating during the next concentration step a stabilization agent is also added. A range of compounds has been found to be suitable for this purpose for example, amides, reactive organic hydroxyl compounds, amino-triazine compounds such as melamine, and the reaction products of these compounds with formaldehyde. The primary function of the stabilization agent is the prevention of precipitation as mentioned above, but some of the compounds which can be used for this purpose may also have beneficial modifying effects on the resins produced. Examples of compounds which can be used as the stabilisation agent are, acetamide, sulphanilamide, malonamide, para-toluene sulphonamide, succinamide, dicyandiamide, phenol, ethylene glycol, o-cresol, melamine-formaldehyde resins. After addition of the further urea and the stabilization agent the pH is preferably adjusted to the range 7.0 to 8.0.

The amount of stabilization agent used preferably will be such that units derived therefrom will comprise not more than 4 per cent by weight of the resin, more preferably not more than 2.00 per cent.

Vacuum concentration is then re-commenced to carry out step (d) preferably under the same conditions as step (b).

Finally when the desired viscosity has been reached, the concentrated liquid product is discharged hot into trays and allowed to cool, whereupon it will solidify to a brittle solid, which, although slightly sticky in feel, is friable and can be ground to a powder.

The powder can be used in the manufacture of laminates, adhesives and other products, and the preferred degree of condensation of the resin is in the range 30 to 43 per cent, more preferably 30 to 40 per cent.

An embodiment of the invention will now be described by way of example only.

EXAMPLE 1

A solid urea-formaldehyde resin (U:F ratio=1:1.5) was produced by vacuum distillation of an aqueous urea-formaldehyde resin solution. A small quantity of a spray-dried melamine formaldehyde resin (commercially available from BIP Chemicals Ltd as BL435) was incorporated as stabilization agent during the process and the product was a sticky but friable solid at room temperature.

The amounts of ingredients used were as follows:

TABLE I

|  | Parts by weight | Parts by volume |
|---|---|---|
| Formalin (40%) | 500 | 100 |
| 1st Urea Charge | 135 |  |
| 2nd Urea Charge | 130 |  |
| BL435 | 5 |  |

Manufacture of the resin employed the following procedure.

The formalin and 1st urea charge were charged to a still equipped with steam heating and the pH of the mixture was checked. This may be adjusted as necessary with sodium hydroxide or formic acid.

The reactant mixture was then allowed to reach reflux and then to distil freely.

Distillation was continued until the viscosity of a sample of resin cooled to 25° C. was about 40 centipoise.

The steam was then turned off and full cooling applied to the still (with cold water) to cool the reactant mixture to 65° C. when the cooling water was turned off.

The pH of the batch was checked and adjusted to pH 8.0 with sodium hydroxide.

A vacuum of 650 mm Hg was applied to the still in stages until the reactant mixture was distilling steadily, and the steam heating was then turned on again.

When 50 parts by volume of distillate had been collected the steam was turned off and the vacuum released. The viscosity of the batch was checked and found to be 4 poises at 25° C.

The second charge of urea and the BL435 were then charged to the still and dissolved.

When the urea and BL435 had dissolved the pH of the resin solution was checked and adjusted as necessary to pH 7.5 (using sodium hydroxide or formic acid), and the heating was then turned on and a vacuum applied as before.

Distillation under vacuum was continued, the heat input rate (ie steam pressure) being adjusted to give a resin temperature of 100° C., until a total of 82 parts by volume of distillate had been collected when the steam was turned off and the distillation allowed to subside.

The vacuum was released and agitation stopped and the viscosity of the resin measured. The viscosity was 400 poises at 100° C. and the resin was discharged into polypropylene trays and allowed to cool.

The resin produced was a friable solid which readily dissolved in warm water, yielding a milky solution in which the majority of the resin has dissolved. There is a small fraction, eg 10% by weight, of higher molecular weight material which remains suspended to give the milky appearance but is insufficient to precipitate. The resin is totally soluble in a mixture of 90% water and 10% dimethyl formamide. It was analysed with the results given below in Table II.

TABLE II

|  | Analysis |
|---|---|
| Nitrogen (%) | 30.72 |
| Urea (%) | 65.83 |
| Total CH$_2$O (%) | 44.4 |
| Free CH$_2$O (%) | 0.7 |
| Combined CH$_2$O (%) | 43.7 |
| U.F. Molar Ratio | 1:1.35 |
| Degree of Condensation (%) | 31.1 |
| *Total water content (%) | 9 |

*Total water content is determined by placing a 10 g sample in an oven at 145° C. for 1 hour and measuring weight loss, this being expressed as a precentage of the original weight. It should be noted that this figure will include water produced by further condensation of the urea and formaldehyde at the high temperature used. The free water content of the solid product will clearly be much lower than this figure, but is virtually impossible to measure accurately.

EXAMPLES 2 AND 3

Solid urea-formaldehyde resins were manufactured using the process described in Example 1 except that the urea formaldehyde molar ratio of the resins was slightly different and, in place of the BL 435 used as stabilisation agent in Example 1, there were used sulphanilamide and malonamide respectively.

The resins produced were friable solids at room temperature, and less sticky than that produced in Example I, and were soluble in warm water, to yield a milky solution as in Example I, and totally soluble in the water/DMF mixture.

The details of analysis of the resins produced are given below in Table III.

TABLE III

| Example No | 2 | 3 |
|---|---|---|
| Urea:formaldehyde molar ratio | 1:1.35 | 1:1.3 |
| Stabilization agent | Sulphanilamide | malonamide |
| Content of stabilization agent in resin | 1.7% by wt | 0.87% by wt |
| *Total water content | 10% | 7.4% |
| Degree of Condensation | 38% | 37.5% |

A 30% w/w aqueous solution of the resin produced in Example 2 was prepared and found to be an effective wood adhesive when used with a suitable catalyst such as ammonium sulphamate.

I claim:

1. A resin comprising a reaction product of urea and formaldehyde having a ratio of formaldehyde to urea which is between 2.0:1 and 1.1:1 wherein the degree of condensation of the resin is between 25% and 45%, and the resin is a solid at room temperature.

2. A solid resin according to claim 1 in which the degree of condensation is between 30% and 43%.

3. A solid resin according to claim 1 in which the degree of condensation is between 30% and 40%.

4. A solid resin according to claim 1 which comprises also units derived from an amide, a reactive hydroxyl compound or an amino-triazine compound or a formaldehyde reaction product of one of these compounds, said units comprising not more than 4 per cent by weight of the resin.

5. A solid resin according to claim 4 in which said units are selected from the group consisting of units derived from acetamide, sulphanilamide, malonamide, p-toluene sulphonamide, succinamide, dicyandiamide, phenol, o-cresol or a partially condensed melamine-formaldehyde resin.

6. A solid resin according to claim 4 in which the units comprise not more than 2.00 percent by weight of the resin.

7. A process for the manufacture of a solid ureaformaldehyde resin as claimed in claim 1 which comprises the steps of
   (a) reacting a solution of formaldehyde in water with urea at a molar ratio of formaldehyde to urea which is greater THAN 2.5:1.
   (b) concentrating the solution so made until its total water content was less than 50% by weight.
   (c) adding further urea to adjust the molar ratio of formaldehyde to urea to between 2.0:1 and 1.1:1 and
   (d) concentrating the solution further without precipitation of solid resin to reduce the water content to such a level that on cooling the liquid resin product a friable solid is obtained, wherein a stabilization agent is reacted into said solution of formaldehyde or urea and formaldehyde prior to step (d) in order to prevent precipitation of resin in step (d).

8. A process according to claim 7 in which step (a) is carried out at a pH in the range of 5.5 to 6.5.

9. A process according to claim 7 in which water is allowed to distil off the reacting mixture in step (a).

10. A process according to claim 7 in which the resin is taken to a degree of condensation not greater than 40% through all of steps (a) to (d).

11. A process according to claim 7 in which the stabilization agent is selected from the group consisting of melamine, partially condensed, melamine-formaldehyde resins, acetamide, sulphanilamide, malonamide, p-toluene sulphonamide, succinamide, dicyandiamide, ethylene glycol, phenol and o-cresol 12. A process according to claim 10 in which the molar ratio of formaldehyde to urea is adjusted to a value in the range 1.2:1 to 1.6:1 in step (c).

13. A process according to claim 7 in which in step (a) a mixture of urea and another amino monomer is used, the proportion of the latter being no more than 40 mole % of the mixture.

14. A process according to claim 7 in which step (b) is carried out under mildly alkaline conditions.

15. A process according to claim 14 in which step (d) is carried out under neutral to mildly alkaline conditions.

* * * * *